(12) United States Patent
Kim

(10) Patent No.: US 11,358,628 B2
(45) Date of Patent: Jun. 14, 2022

(54) APPARATUS AND METHOD FOR CONTROLLING MOTOR DRIVEN POWER STEERING SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 162 days.

(21) Appl. No.: 16/663,748

(22) Filed: Oct. 25, 2019

(65) Prior Publication Data
US 2020/0130727 A1    Apr. 30, 2020

(30) Foreign Application Priority Data

Oct. 26, 2018 (KR) .................. 10-2018-0128993

(51) Int. Cl.
*B62D 5/04* (2006.01)
*B62D 6/02* (2006.01)
*B62D 6/00* (2006.01)

(52) U.S. Cl.
CPC ......... *B62D 5/0421* (2013.01); *B62D 5/0463* (2013.01); *B62D 6/002* (2013.01); *B62D 6/02* (2013.01)

(58) Field of Classification Search
CPC ........ B62D 5/0421; B62D 6/02; B62D 6/002; B62D 5/0463; B62D 1/286; B62D 15/025; B62D 6/007; B62D 5/046
USPC ........................................ 180/443
See application file for complete search history.

(56) References Cited

U.S. PATENT DOCUMENTS

2018/0178834 A1* 6/2018 Moreillon .............. B62D 1/286
2019/0210638 A1* 7/2019 Ueno .................... B62D 5/0463
2019/0300013 A1* 10/2019 Shiraishi ........... B60W 60/0053
(Continued)

FOREIGN PATENT DOCUMENTS

| CN | 101746412 | 6/2010 |
| CN | 104554433 | 4/2015 |
| CN | 104742957 | 7/2015 |

(Continued)

OTHER PUBLICATIONS

Chinese Office Action dated Sep. 27, 2021 issued in Chinese Application No. 201911010338.4.

*Primary Examiner* — Scott A Reinbold
(74) *Attorney, Agent, or Firm* — DLA Piper LLP (US)

(57) ABSTRACT

An apparatus for controlling an MDPS system may include: a column torque sensor configured to sense column torque applied to a steering column of a vehicle; a vehicle velocity sensor configured to sense vehicle velocity of the vehicle; an MDPS basic logic unit configured to decide a first assist command current for driving an MDPS motor in a manual driving mode of a driver; an autonomous driving control unit configured to decide a second assist command current for driving the MDPS motor in an autonomous driving mode of the vehicle; and a mode switching control unit configured to decide a weight into which the driver's steering intention is reflected, and apply the decided weight to the first and second assist command currents to decide a final assist command current for driving the MDPS motor when the vehicle is switched from the autonomous driving mode to the manual driving mode.

18 Claims, 3 Drawing Sheets

(56) References Cited

U.S. PATENT DOCUMENTS

2019/0300044 A1* 10/2019 Tsubaki ................. B62D 6/007
2020/0094870 A1* 3/2020 Shoji .................... B62D 5/0481

FOREIGN PATENT DOCUMENTS

| | | |
|---|---|---|
| CN | 108248677 | 7/2018 |
| DE | 19601827 | 7/1997 |
| DE | 102016211468 | 12/2017 |
| JP | 2004-017881 | 1/2004 |
| JP | 2004-256076 | 9/2004 |
| JP | 2015-093569 | 5/2015 |
| KR | 10-2017-0065793 A | 6/2017 |

* cited by examiner

APPARATUS AND METHOD FOR CONTROLLING MOTOR DRIVEN POWER STEERING SYSTEM

CROSS-REFERENCES TO RELATED APPLICATIONS

The present application claims priority to Korean application number 10-2018-0128993, filed on Oct. 26, 2018, which is incorporated by reference in its entirety.

BACKGROUND OF THE INVENTION

The present invention relates to an apparatus and method for controlling a motor driven power steering (MDPS) system, and more particularly, to an apparatus and method for controlling an MDPS system, which can control an MDPS motor in consideration of an autonomous driving mode and a manual driving mode of a vehicle.

A power steering of a vehicle is a steering device based on power, and assists a driver to operate a steering wheel. Conventionally, a hydraulic power steering had been mainly used as the power steering. Recently, however, the use of an MDPS system which uses the force of a motor has increased. That is because the MDPS system has a small weight, occupies a small space and does not require oil exchange, compared to the existing hydraulic power steering system.

The MDPS system determines driving conditions of the vehicle through a torque sensor to measure a driver's steering torque inputted to the steering wheel, a steering angle sensor to measure a steering angle or steering angular velocity of the steering wheel, and a vehicle velocity sensor to measure vehicle velocity, and provides assist torque through an electric motor based on the steering torque applied to a steering shaft as the driver operates the steering wheel.

An autonomous vehicle recognizes the environments of the road on which the autonomous vehicle is traveling, through autonomous driving modules (a camera sensor, a radar sensor, a LiDAR sensor and the like) in an autonomous driving mode, and decides a command steering angle and command torque required for an operation of an MDPS system applied to the autonomous vehicle, thereby controlling the operation of the MDPS system.

At this time, when the autonomous vehicle abnormally operates, for example, when the autonomous driving modules suddenly break down, a driver needs to operate a steering wheel in person, in order to control the operation of the autonomous vehicle. At this time, when the position control of the MDPS system is continuously performed by the autonomous driving modules even though the driver forcibly operates the steering wheel, the vehicle may not be controlled as intended by the driver. In this case, a serious accident may occur.

In order to solve the above-described problem, a method of determining a driver's steering intention through the magnitude of column torque or a variation in phase difference between a steering angle sensor and a motor angle sensor may be considered. Even in this case, however, while the position control of the MDPS by the autonomous driving modules is performed, the driver's steering may suddenly occur. Thus, a motor control current may be significantly changed to cause a driver to feel a sense of steering difference. That is, when the vehicle is switched from the autonomous driving mode to the manual driving mode, momentary control stability may be degraded by a difference in output between the respective modes. The degradation in the control stability may cause an abnormal behavior of the vehicle or a sense of difference such as steering vibration.

The related art is disclosed in Korean Patent Application Publication No. 10-2017-0065793 published on Jun. 14, 2017.

SUMMARY OF THE INVENTION

Embodiments of the present invention are directed to an apparatus and method for controlling an MDPS system, which can remove a reduction in momentary control stability for an MDPS motor, which occurs due to an output difference between an autonomous driving mode and a manual driving mode when a vehicle is switched from the autonomous driving mode to the manual driving mode, and remove an abnormal behavior of the vehicle or a sense of difference such as steering vibration.

In one embodiment, an apparatus for controlling an MDPS system may include: a column torque sensor configured to sense column torque applied to a steering column of a vehicle; a vehicle velocity sensor configured to sense vehicle velocity of the vehicle; an MDPS basic logic unit configured to decide a first assist command current for driving an MDPS motor in a manual driving mode of a driver, based on the column torque and the vehicle velocity which are sensed by the column torque sensor and the vehicle sensor, respectively; an autonomous driving control unit configured to decide a second assist command current for driving the MDPS motor in an autonomous driving mode of the vehicle; and a mode switching control unit configured to decide a weight into which the driver's steering intention is reflected, based on the first assist command current, when the driver's steering occurs in the autonomous driving mode of the vehicle, and apply the decided weight to the first and second assist command currents to decide a final assist command current for driving the MDPS motor when the vehicle is switched from the autonomous driving mode to the manual driving mode.

The mode switching control unit may decide the final assist command current by determining that the driver has a steering intention, only when a state in which the magnitude of the column torque is equal to or more than a preset reference value is retained for a preset reference time or more.

The mode switching control unit may decide the final assist command current by complementarily applying the weight to the first and second assist command currents, and decide the final assist command current to approach the first assist command current from the second assist command current as the weight is changed from a low value toward a high value.

The mode switching control unit may decide the weight to have a larger value as the magnitude of the first assist command current is increased in the range of a preset lower limit to a preset upper limit.

The mode switching control unit may set the weight to a value of '0' until the magnitude of the first assist command current reaches the lower limit, wherein the lower limit is preset in consideration of an assist command current which is decided through the MDPS basic logic unit as the column torque is sensed by an external factor other than the driver's steering.

The mode switching control unit may set the weight to a value of '1' when the magnitude of the first assist command current reaches the upper limit.

When the weight is set to the value of '1', the mode switching control unit may retain the weight set to the value of '1' until the autonomous driving mode of the vehicle is resumed, such that the manual driving mode is maintained.

The mode switching control unit may decide the weight by varying an offset between the magnitude of the lower limit and the magnitude of the upper limit, according to the vehicle velocity sensed by the vehicle velocity sensor.

The mode switching control unit may decide the weight by varying the offset to have a smaller value as the vehicle velocity is increased.

The mode switching control unit may perform noise filtering through low pass filtering on the first assist command current decided by the MDPS basic logic unit, calculate the magnitude of the noise-filtered first assist command current, and then decide the weight based on the calculated magnitude of the first assist command current.

In another embodiment, a method for controlling an MDPS system may include: deciding, by an autonomous driving control unit, a second assist command current for driving an MDPS motor in an autonomous driving mode of a vehicle, and driving the MDPS motor; deciding, by an MDPS basic logic unit, a first assist command current for driving the MDPS motor in a manual driving mode of a driver, based column torque applied to a steering column of the vehicle and vehicle velocity of the vehicle, in the autonomous driving mode of the vehicle; deciding, by a motor switching control unit, a weight into which the driver's steering intention is reflected, based on the decided first assist command current; and deciding, by the mode switching control unit, a final assist command current for driving the MDPS motor when the vehicle is switched from the autonomous driving mode to the manual driving mode, by applying the decided weight to the first and second assist command currents.

In accordance with the embodiments of the present invention, the apparatus and method for controlling an MDPS system may decide the optimal assist command current for driving the MDPS motor through the predetermined weight into which the driver's steering intention is reflected and control the operation of the MDPS motor, when the vehicle is switched from the autonomous driving mode to the manual driving mode. Therefore, the apparatus and method can secure the control stability for the MDPS motor during the mode switching, and reduce an abnormal behavior of the vehicle or a sense of difference such as steering vibration.

DESCRIPTION OF SPECIFIC EMBODIMENTS

Hereafter, a control apparatus and method of an MDPS in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
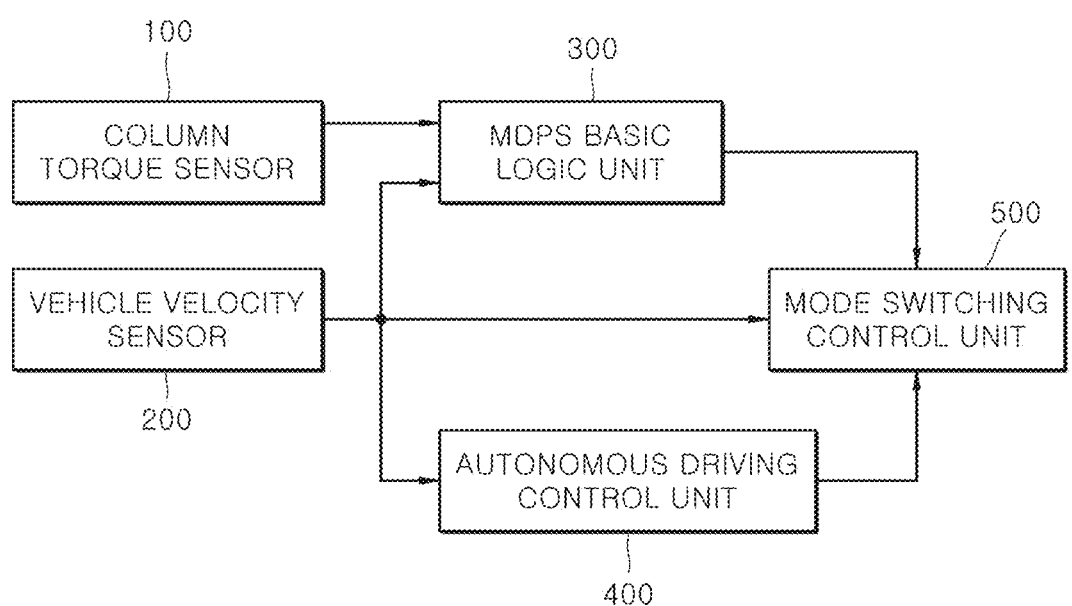
FIG. 1 is a block diagram illustrating an apparatus for controlling an MDPS system in accordance with an embodiment of the present invention.
Figure 2:
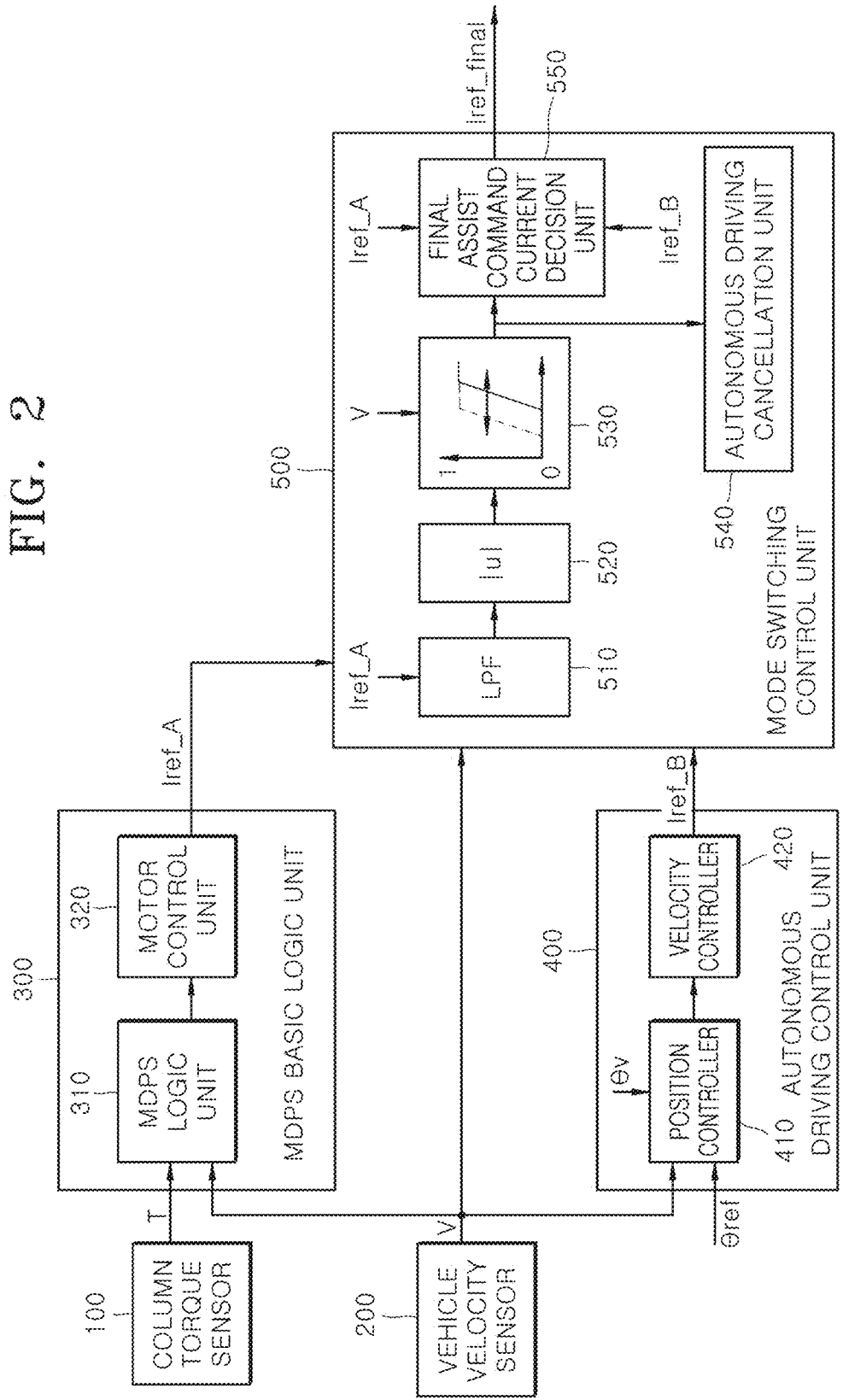
FIG. 2 is a block diagram illustrating the detailed configuration of the apparatus for controlling an MDPS system in accordance with the embodiment of the present invention.

FIG. 1 is a block diagram illustrating an apparatus for controlling an MDPS system in accordance with an embodiment of the present invention, and FIG. 2 is a block diagram illustrating the detailed configuration of the apparatus for controlling an MDPS system in accordance with the embodiment of the present invention.

Referring to FIG. 1, the apparatus for controlling an MDPS system in accordance with the embodiment of the present invention may include a column torque sensor 100, a vehicle velocity sensor 200, an MDPS basic logic unit 300, an autonomous driving control unit 400 and a mode switching control unit 500.

The column torque sensor 100 may sense column torque T applied to a steering column of a vehicle, and transfer the sensed column torque T to the MDPS basic logic unit 300 and the mode switching control unit 500, which will be described below. The column torque T applied to the steering column may include not only column torque applied by a driver, but also column torque caused by a lateral force applied to the vehicle due to the state of a road and a driving environment. The influence of the above-described noise column torque on the operation of the mode switching control unit 500 may be removed through a reference value and a lower limit which will be described below.

The vehicle velocity sensor 200 may sense a vehicle velocity V of the traveling vehicle. The vehicle velocity sensor 200 may include various sensors, for example, a sensor for sensing a vehicle velocity using an angular velocity of a wheel, a sensor for sensing a vehicle velocity by measuring an engine RPM (Revolution Per Minute), and a sensor for sensing a vehicle velocity using GPS (Global Positioning System).

The MDPS basic logic unit 300 may decide a first assist command current Iref_A for driving an MDPS motor in a manual driving mode of the driver, based on the column torque T and the vehicle velocity V which are sensed by the column torque sensor 100 and the vehicle velocity sensor 200. The MDPS basic logic unit 300 may decide the first assist command current Iref_A for driving the MDPS motor in the manual driving mode by applying a boost curve to the column torque T and the vehicle velocity V. For this operation, as illustrated in FIG. 2, the MDPS basic logic unit 300 may include an MDPS logic unit 310 and a motor control unit 320. The MDPS logic unit 310 may calculate an assist command current value depending on the column torque T and the vehicle velocity V, using the boost curve, and the motor control unit 320 may generate the first assist command current Iref_A according to the calculated assist command current value, and control the MDPS motor.

The autonomous driving control unit 400 may decide a second assist command current Iref_B for driving the MDPS motor in the autonomous driving mode. The autonomous driving control unit 400 may decide the second assist command current Iref_B for driving the MDPS motor in the autonomous driving mode based on a command steering angle θref decided through the traveling environment of the vehicle, sensed by autonomous driving modules (for example, a camera sensor, a radar sensor, a LiDAR sensor and the like) (not illustrated) mounted in the vehicle, the vehicle velocity V sensed by the vehicle velocity sensor 200, and a current steering angle θv of the vehicle, provided from a steering angle sensor (not illustrated). For this operation, as illustrated in FIG. 2, the autonomous driving control unit 400 may include a position controller 410 and a velocity controller 420 for controlling the position and velocity of the MDPS motor in the autonomous driving mode.

When a driver's steering occurs in the autonomous driving mode of the vehicle, the mode switching control unit 500 may decide a weight into which the driver's steering intention is reflected, based on the first assist command current Iref_A, and apply the decided weight to the first and second assist command current Iref_A and Iref_B to decide a final assist command current Iref_final for driving the MDPS motor when the vehicle is switched from the autonomous driving mode to the manual driving mode.

That is, as described above, when the driver's steering suddenly occurs while the MDPS motor is controlled through the second assist command current Iref_B in the autonomous driving mode, the control current of the MDPS motor may be significantly changed to reduce control stability of the MDPS motor and to cause the driver to feel a sense of steering difference. Such problems may occur due to a limitation that the MDPS motor control is selectively performed only through the second assist command current Iref_B and the first assist command current Iref_A in the autonomous driving mode and the manual driving mode, respectively.

Thus, the control apparatus in accordance with the present embodiment may employ the configuration that controls the MDPS motor through the final assist command current Iref_final decided through the weight to be described below, when a driver's steering occurs in the autonomous driving mode, thereby not only improving the control stability for the MDPS motor when the vehicle is switched from the autonomous driving mode to the manual driving mode, but also reducing an abnormal behavior of the vehicle or a sense of difference such as steering vibration.

Hereafter, referring to FIG. 2, the configuration of the above-described configuration of the present embodiment will be described in detail as a sub configuration of the mode switching control unit 500.

As illustrated in FIG. 2, the mode switching control unit 500 may include a filter unit 510, a magnitude calculation unit 520, a weight decision unit 530, an autonomous driving cancellation unit 540 and a final assist command current decision unit 550.

The mode switching control unit 500 may preferentially determine whether the driver intervenes in steering, before deciding the final assist command current Iref_final through sequential operations of the filter unit 510, the magnitude calculation unit 520, the weight decision unit 530, the autonomous driving cancellation unit 540 and the final assist command current decision unit 550.

Specifically, the column torque T sensed by the column torque sensor 100 may include not only column torque applied by the driver, but also column torque caused by an external factor. For example, the external factor may include a lateral force applied to the vehicle due to the state of the road and the driving environment when the vehicle suddenly runs over an obstacle of the road or the case where the driver unintentionally taps the steering wheel. Thus, although the driver did not actually operate the steering wheel because the driver has no intention to cancel the autonomous driving mode at the moment, the first assist command current may be reflected into the final assist command current through the column torque sensed by the external factor, or the autonomous driving mode may be canceled by the column torque sensed by the external factor. In order to prevent such a situation, the mode switching control unit 500 may preferentially determine whether the driver actually intervenes in steering.

For this operation, the mode switching control unit 500 may determine that the driver has a steering intention, only when the state in which the magnitude of the column torque T is equal to or more than a preset reference value is retained for a preset reference time or more. That is, the column torque caused by the external factor may be caused by a lateral force which is momentarily applied to the steering column. Thus, in the present embodiment, a configuration for setting the magnitude of the column torque T and the lower limit of the retention time may be employed to determine that the driver has a steering intention, when the column torque T having a magnitude equal to or more than the reference value is retained for the reference time or more, and the final assist command current Iref_final may be decided through a blending process for the first and second assist command currents Iref_A and Iref_B. When it is determined that the driver has a steering intention, the final assist command current Iref_final may be decided through the sequential operations of the filter unit 510, the magnitude calculation unit 520, the weight decision unit 530, the autonomous driving cancellation unit 540 and the final assist command current decision unit 550.

The filter unit 510 may perform noise filtering through low pass filtering on the first assist command current Iref_A decided by the MDPS basic logic unit 300.

That is, the column torque T sensed by the column torque sensor 100 may include not only column torque applied by the driver but also high-frequency noise due to a road state (for example, noise caused when the road has holes or foreign matters are present on the road). Since the high-frequency noise is reflected into the first assist command current Iref_A decided by the MDPS basic logic unit 300, the filter unit 510 may preferentially remove the high-frequency noise through low pass filtering on the first assist command current Iref_A.

The magnitude calculation unit 520 may calculate the magnitude of the first assist command current Iref_A whose noise has been filtered by the filter unit 510, and transfer the calculated magnitude to the weight decision unit 530 which will be described below. That is, the absolute value of the first assist command current Iref_A may be transferred to the weight decision unit 530.

The weight decision unit 530 may decide a weight into which the driver's steering intention is reflected, based on the magnitude of the first assist command current Iref_A calculated by the magnitude calculation unit 520. At this time, the weight decision unit 530 may decide the weight to have a larger value as the magnitude of the first assist command current Iref_A is increased in the range of a preset lower limit and a preset upper limit. The configuration for deciding the weight to have a larger value as the magnitude of the first assist command current Iref_A is increased may be based on the premise that the final assist command current decision unit 550 may decide the final assist command current Iref_final such that the final assist command current Iref_final approaches the first assist command current Iref_A from the second assist command current Iref_B, as the weight is changed from a low value toward the a high value.

That is, as the magnitude of the first assist command current Iref_A is increased, it may indicate that the driver's steering intention (or the driver's intention to cancel the autonomous driving mode) is high. Thus, as will be described below, the proportion of the first assist command current Iref_A in the final assist command current Iref_final needs to be increased, and the proportion of the second assist command current Iref_B needs to be decreased. For this operation, the weight decision unit 530 may decide the weight to have a larger value as the magnitude of the first assist command current Iref_A is increased in the range of the preset lower limit and the preset upper limit as illustrated in FIG. 2.

At this time, the weight decision unit 530 may set the weight to a value of '0' until the magnitude of the first assist command current Iref_A reaches the lower limit. The lower limit may be preset in the weight decision unit 530 in consideration of the assist command current which is decided through the MDPS basic logic unit 300 as the column torque is sensed by an external factor other than the driver's steering. Thus, the lower limit may indicate an assist command current corresponding to the above-described reference value.

The weight decision unit 530 may set the weight to a value of '1' when the magnitude of the first assist command current Iref_A reaches the upper limit. That is, when the magnitude of the first assist command current Iref_A reaches the upper limit, it may be determined that the driver has an intention to cancel the autonomous driving mode. Thus, the weight decision unit 530 may set the weight to the value of '1' to switch the vehicle to the manual driving mode. The upper limit may be selected as various values in consideration of a designer's intention and the specification of the MDPS system.

When the weight is set to the value of '1' by the weight decision unit 530, the autonomous driving cancellation unit 540 may retain the weight set to the value of '1' until the autonomous driving mode of the vehicle is resumed. Thus, the manual driving mode may be maintained.

That is, when the weight decision unit 530 sets the weight to the value of '1' to cancel the autonomous driving mode, the autonomous driving cancellation unit 540 may determine that the autonomous driving modules (for example, the camera sensor, the radar sensor, the LiDAR sensor and the like) are in a normal state after the vehicle is normally and stably stopped, and retain the weight set to the value of '1' until the autonomous driving mode is resumed. Thus, the vehicle can be controlled through the manual driving mode by the driver's steering in person.

When deciding the weight, the weight decision unit 530 may decide the weight by varying an offset between the magnitude of the lower limit and the magnitude of the upper limit according to the vehicle velocity V sensed by the vehicle velocity sensor 200. Specifically, the weight decision unit 530 may decide the weight by varying the offset to have a smaller value as the vehicle velocity V is increased.

That is, as the vehicle velocity V is increased, the possibility that a dangerous situation will occur may increase, and the magnitude of the first assist command current Iref_A with respect to the column torque may decrease due to the logic of the MDPS basic logic unit 300. Therefore, in order to avoid a dangerous situation through the driver's steering in person and to compensate for the magnitude of the first assist command current Iref_A, which decreases at high speed, the weight decision unit 530 may vary the offset to have a smaller value as the vehicle velocity V is increased. Therefore, the magnitude of the lower limit may be decreased, or the point at which the weight starts to increase as a value which is not 0 may be advanced, which makes it possible to avoid a dangerous situation at high speed and to compensate for the decrease in magnitude of the first assist command current Iref_A. At this time, the variation of the offset may be designed in various manners depending on the designer's intention and the specification of the MDPS system.

When the weight is decided through the above-described process, the final assist command current decision unit 550 may apply the decided weight to the first and second assist command currents Iref_A and Iref_B, and decide the final assist command current Iref_final for driving the MDPS motor when the vehicle is switched from the autonomous driving mode to the manual driving mode.

At this time, the final assist command current decision unit 550 may decide the final assist command current Iref_final by complementarily applying the weight to the first and second assist command currents Iref_A and Iref_B. Specifically, the final assist command current decision unit 550 may decide the final assist command current Iref_final to approach the first assist command current Iref_A from the second assist command current Iref_B as the weight K is changed from a low value toward a high value. That is, as the weight K is changed from a low value toward a high value, the proportion of the first assist command current Iref_A may be increased, and the proportion of the second assist command current Iref_B may be decreased. Then, the first and second assist command currents Iref_A and Iref_B may be reflected into the final assist command current Iref_final. The final assist command current Iref_final may be decided by Equation 1 below.

$$I_{ref\_final} = KI_{ref\_A} + (1-K)I_{ref\_B} \qquad \text{[Equation 1]}$$

According to Equation 1, the final assist command current Iref_final may approach the first assist command current Iref_A as the weight K converges to 1, and approach the second assist command current Iref_B as the weight K converges to 0.

Therefore, when the driver intends to cancel the autonomous driving mode through the compulsive steering in the autonomous driving mode, an autonomous driving gain (i.e. 1−K in Equation 1) applied to the second assist command current Iref_B may gradually decrease, and a gain (i.e. the weight K) applied to the first assist command current Iref_A may gradually increase. During the mode switching from the autonomous driving mode to the manual driving mode, the autonomous driving mode may be more naturally canceled without a sense of difference on the steering wheel.

Figure 3:
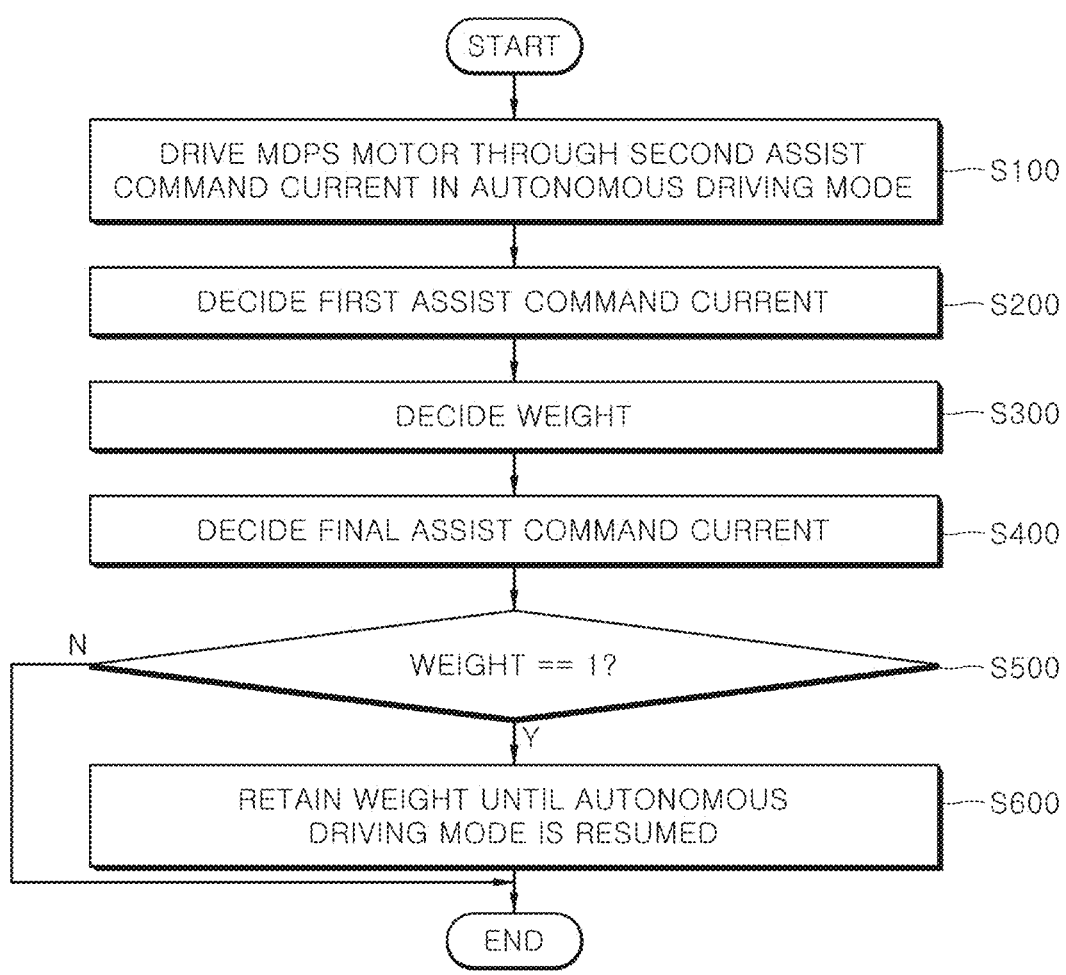
FIG. 3 is a flowchart illustrating a method for controlling an MDPS system in accordance with an embodiment of the present invention.

FIG. 3 is a flowchart illustrating a method for controlling an MDPS system in accordance with an embodiment of the present invention.

Referring to FIG. 3, the method for controlling an MDPS system in accordance with the embodiment of the present invention will be described as follows. First, the autonomous driving control unit 400 may decide the second assist command current Iref_B for driving the MDPS motor in the autonomous driving mode of the vehicle, and drive (control) the MDPS motor, in step S100.

Then, the MDPS basic logic unit 300 may decide the first assist command current Iref_A for driving (controlling) the MDPS motor in the manual driving mode of the driver, based on the column torque T applied to the steering column of the vehicle and the vehicle velocity V of the vehicle, in the autonomous driving mode of the vehicle, in step S200.

Then, the mode switching control unit 500 may decide a weight into which the driver's steering intention is reflected, based on the first assist command current Iref_A decided in step S200.

In step S300, the mode switching control unit 500 may perform noise filtering through low pass filtering on the first assist command current Iref_A decided by the MDPS basic logic unit 300, calculate the magnitude of the noise-filtered first assist command current Iref_A, and then decide the weight based on the calculated magnitude of the first assist command current Iref_A.

In step S300, the mode switching control unit 500 may decide the weight to have a larger value as the magnitude of the first assist command current Iref_A is increased in the range of a preset lower limit and a preset upper limit.

In step S300, the mode switching control unit 500 may set the weight to a value of '0' until the magnitude of the first assist command current Iref_A reaches the lower limit. At this time, the lower limit may be preset in consideration of an assist command current which is decided through the MDPS basic logic unit 300 as column torque is sensed by an external factor other than the driver's steering.

In step S300, the mode switching control unit 500 may set the weight to a value of '1' when the magnitude of the first assist command current Iref_A reaches the upper limit.

In step S300, the mode switching control unit 500 may decide the weight by varying an offset between the magnitude of the lower limit and the magnitude of the upper limit according to the vehicle velocity V. Specifically, the mode switching control unit 500 may decide the weight by varying the offset to have a smaller value as the vehicle velocity is increased.

After the weight is decided through step S300, the mode switching control unit 500 may apply the decided weight to the first and second assist command currents Iref_A and Iref_B, and decide the final assist command current Iref_final for driving (controlling) the MDPS motor when the vehicle is switched from the autonomous driving mode to the manual driving mode, in step S400.

In step S400, the mode switching control unit 500 may decide the final assist command current Iref_final by complementarily applying the weight to the first and second assist command currents Iref_A and Iref_B. Specifically, the mode switching control unit 500 may decide the final assist command current Iref_final to approach the first assist command current Iref_A from the second assist command current Iref_B as the weight is changed from a low value toward a high value.

In step S400, the mode switching control unit 500 may determine that the driver has a steering intention, only when the state in which the magnitude of the column torque is equal to or more than a preset reference value is retained for a preset reference time or more, and decide the final assist command current. For this operation, the method in accordance with the present embodiment may further include determining whether the state in which the magnitude of the column torque is equal to or more than the preset reference value is retained for the preset reference time or more, before step S300. In this case, the method may be implemented to perform steps following step S300 only when the state in which the magnitude of the column torque is equal to or more than the preset reference value is retained for the preset reference time or more.

When it is determined in step S500 that the weight was set to the value of '1' in step S300, the mode switching control unit 500 may retain the weight set to the value of '1' until the autonomous driving mode of the vehicle is resumed, thereby maintaining the manual driving mode, in step S600.

As such, the method for controlling an MDPS system in accordance with the present embodiment may decide the optimal assist command current for driving the MDPS motor through the predetermined weight into which the driver's steering intention is reflected and control the operation of the MDPS motor, when the vehicle is switched from the autonomous driving mode to the manual driving mode. Therefore, the method can secure the control stability for the MDPS motor during the mode switching, and reduce an abnormal behavior of the vehicle or a sense of difference such as steering vibration.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for controlling an MDPS (Motor Driven Power Steering) system, comprising:
    a column torque sensor configured to sense column torque applied to a steering column of a vehicle;
    a vehicle velocity sensor configured to sense vehicle velocity of the vehicle;
    an MDPS basic logic unit configured to decide a first assist command current for driving an MDPS motor in a manual driving mode of a driver, based on the column torque and the vehicle velocity which are sensed by the column torque sensor and the vehicle velocity sensor, respectively;
    an autonomous driving control unit configured to decide a second assist command current for driving the MDPS motor in an autonomous driving mode of the vehicle; and
    a mode switching control unit configured to decide a weight into which a driver's steering intention is reflected, based on the first assist command current, when the driver's steering occurs in the autonomous driving mode of the vehicle, and apply the decided weight to the first and second assist command currents to decide a final assist command current for driving the MDPS motor when the vehicle is switched from the autonomous driving mode to the manual driving mode,
    wherein the mode switching control unit performs noise filtering through low pass filtering on the first assist command current decided by the MDPS basic logic unit, calculates a magnitude of the noise-filtered first assist command current, and then decides the weight based on the calculated magnitude of the first assist command current.

2. The apparatus of claim 1, wherein the mode switching control unit decides the final assist command current by determining that the driver has a steering intention, only when a state in which the magnitude of the column torque is equal to or more than a preset reference value is retained for a preset reference time or more.

3. The apparatus of claim 1, wherein the mode switching control unit decides the final assist command current by complementarily applying the weight to the first and second assist command currents, and decides the final assist command current to approach the first assist command current from the second assist command current as the weight is changed from a low value toward a high value.

4. The apparatus of claim 3, wherein the mode switching control unit decides the weight to have a larger value as the magnitude of the first assist command current is increased in the range of a preset lower limit to a preset upper limit.

5. The apparatus of claim 4, wherein the mode switching control unit sets the weight to a value of '0' until the magnitude of the first assist command current reaches the lower limit, wherein the lower limit is preset in consideration of an assist command current which is decided through the MDPS basic logic unit as the column torque is sensed by an external factor other than the driver's steering.

6. The apparatus of claim 4, wherein the mode switching control unit sets the weight to a value of '1' when the magnitude of the first assist command current reaches the upper limit.

7. The apparatus of claim 6, wherein when the weight is set to the value of '1', the mode switching control unit retains the weight set to the value of '1' until the autonomous driving mode of the vehicle is resumed, such that the manual driving mode is maintained.

8. The apparatus of claim 4, wherein the mode switching control unit decides the weight by varying an offset between the magnitude of the lower limit and the magnitude of the upper limit, according to the vehicle velocity sensed by the vehicle velocity sensor.

9. The apparatus of claim 8, wherein the mode switching control unit decides the weight by varying the offset to have a smaller value as the vehicle velocity is increased.

10. A method for controlling an MDPS system, comprising:
deciding, by an autonomous driving control unit, a second assist command current for driving an MDPS motor in an autonomous driving mode of a vehicle, and driving the MDPS motor;
deciding, by an MDPS basic logic unit, a first assist command current for driving the MDPS motor in a manual driving mode of a driver, based column torque applied to a steering column of the vehicle and vehicle velocity of the vehicle, in the autonomous driving mode of the vehicle;
deciding, by a motor switching control unit, a weight into which a driver's steering intention is reflected, based on the decided first assist command current; and
deciding, by the mode switching control unit, a final assist command current for driving the MDPS motor when the vehicle is switched from the autonomous driving mode to the manual driving mode, by applying the decided weight to the first and second assist command currents, wherein in the deciding of the weight,
the mode switching control unit performs noise filtering through low pass filtering on the first assist command current decided by the MDPS basic logic unit, calculates a magnitude of the noise-filtered first assist command current, and then decides the weight based on the calculated magnitude of the first assist command current.

11. The method of claim 10, wherein in the deciding of the final assist command current,
the mode switching control unit decides the final assist command current by determining that the driver has a steering intention, only when a state in which the magnitude of the column torque is equal to or more than a preset reference value is retained for a preset reference time or more.

12. The method of claim 10, wherein in the deciding of the final assist command current,
the mode switching control unit decides the final assist command current by complementarily applying the weight to the first and second assist command currents, and decides the final assist command current to approach the first assist command current from the second assist command current as the weight is changed from a low value toward a high value.

13. The method of claim 12, wherein in the deciding of the weight,
the mode switching control unit decides the weight to have a larger value as the magnitude of the first assist command current is increased in the range of a preset lower limit to a preset upper limit.

14. The method of claim 13, wherein in the deciding of the weight,
the mode switching control unit sets the weight to a value of '0' until the magnitude of the first assist command current reaches the lower limit, wherein the lower limit is preset in consideration of an assist command current which is decided through the MDPS basic logic unit as the column torque is sensed by an external factor other than the driver's steering.

15. The method of claim 13, wherein in the deciding of the weight,
the mode switching control unit sets the weight to a value of '1' when the magnitude of the first assist command current reaches the upper limit.

16. The method of claim 15, further comprising retaining, by the mode switching control unit, the weight set to the value of '1' until the autonomous driving mode of the vehicle is resumed, such that the manual driving mode is maintained, when the weight is set to the value of '1'.

17. The method of claim 13, wherein in the deciding of the weight,
the mode switching control unit decides the weight by varying an offset between the magnitude of the lower limit and the magnitude of the upper limit, according to the vehicle velocity.

18. The method of claim 17, wherein in the deciding of the weight,
the mode switching control unit decides the weight by varying the offset to have a smaller value as the vehicle velocity is increased.

* * * * *